July 12, 1960 B. G. VAN ESSEN 2,944,826

RECORD PLAYER

Filed Oct. 7, 1957 5 Sheets-Sheet 1

INVENTOR.
Bonifacius G. Van Essen

July 12, 1960 B. G. VAN ESSEN 2,944,826

RECORD PLAYER

Filed Oct. 7, 1957 5 Sheets-Sheet 2

INVENTOR.
Bonifacius G. Van Essen
Bonifacius G. van Essen

INVENTOR.
Bonifacius G. Van Essen

INVENTOR.
Bonifacuus G. Van Essen

July 12, 1960 B. G. VAN ESSEN 2,944,826

RECORD PLAYER

Filed Oct. 7, 1957 5 Sheets-Sheet 5

INVENTOR.
Bonifacius G. Van Essen

Bonifacius G. Van Essen

United States Patent Office 2,944,826

Patented July 12, 1960

2,944,826

RECORD PLAYER

Bonifacius G. van Essen, 102 Barkers Road, Hawthorn, Victoria, Australia

Filed Oct. 7, 1957, Ser. No. 688,772

8 Claims. (Cl. 274—10)

This invention relates to record players and more particularly to an automatic record changer therefor.

It is an object of the present invention to provide a completely automatic turntable assembly for record players whereby continuous and uninterrupted entertainment may be provided.

Another object of the present invention is to provide a novel turntable assembly for automatic record players that has means for sequentially playing both sides of each disc type record.

A further object of the present invention is to provide an automatic record player having a turntable assembly in which a pair of similar turntables are supported in spaced parallel relationship, each of which is provided with self contained drive and brake means, both of which are adapted to be alternately driven from a central drive roller.

A still further object of the present invention is to provide a record changer for record players which is adapted to accommodate disc type records of various sizes, whereby means are included for sequentially playing both sides of each record, one record at a time.

A further object of the present invention is to provide novel safety means for record players of the above type that is automatically operative to deenergize the turntable drive means upon the removal of all of the record players from one of the turntables, thereby preventing damage to the instrument.

Other objects of the invention are to provide a record player bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
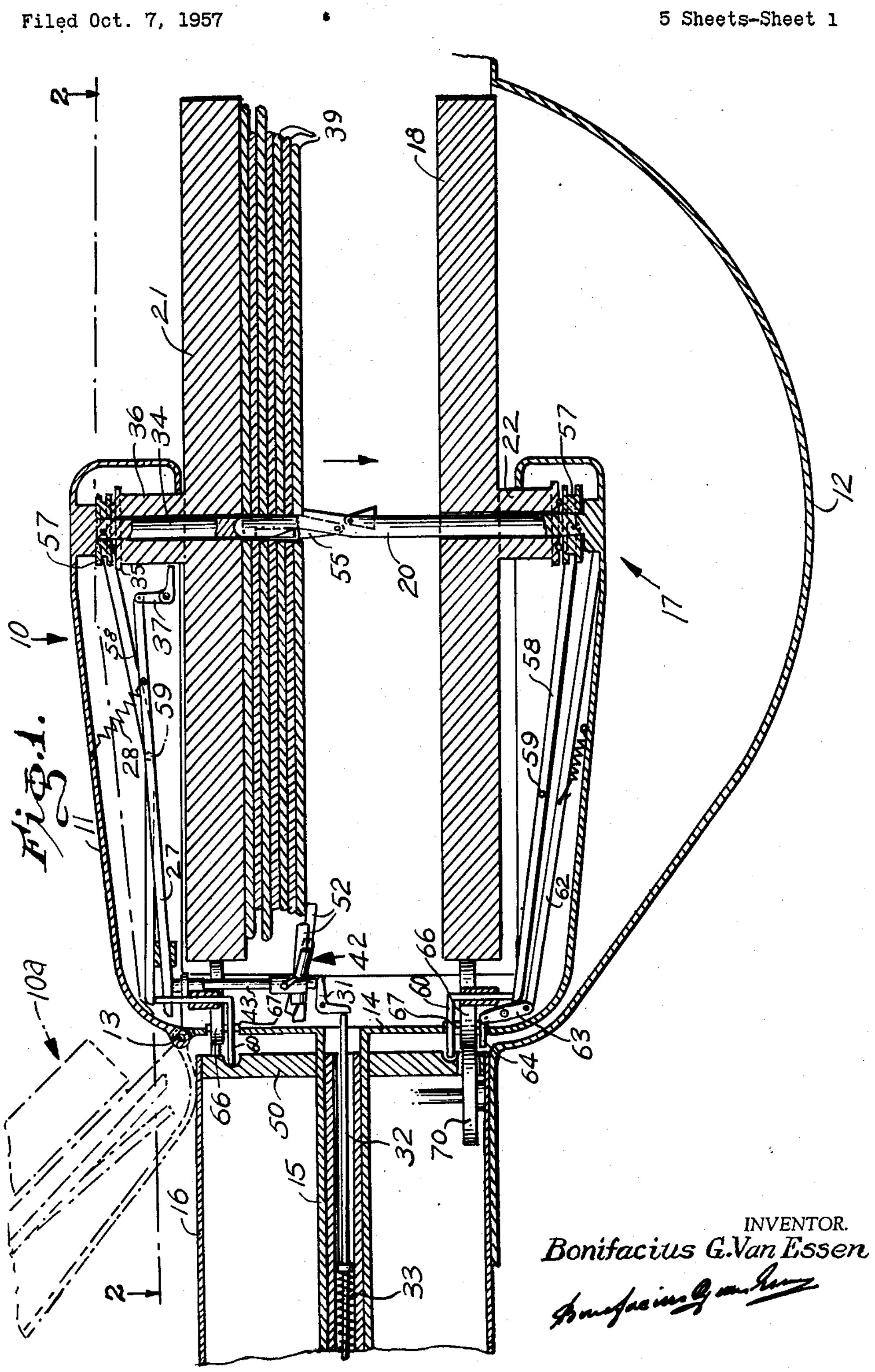
Figure 1 is a vertical sectional view of a preferred embodiment of the present invention taken along line 1—1 of Figure 2.
Figure 2:
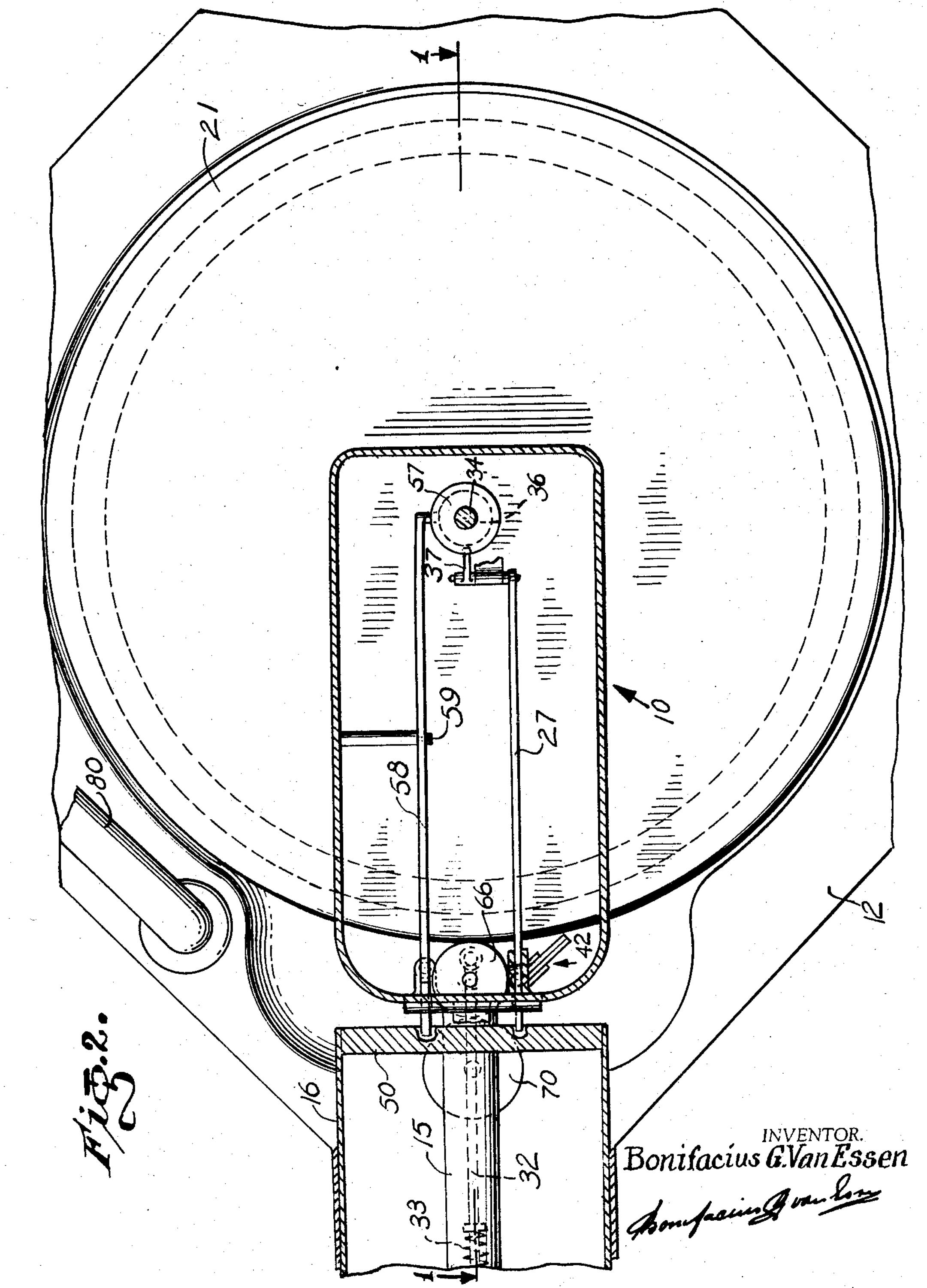
Figure 2 is a horizontal sectional view taken along line 2—2 of Figure 1.
Figure 3:
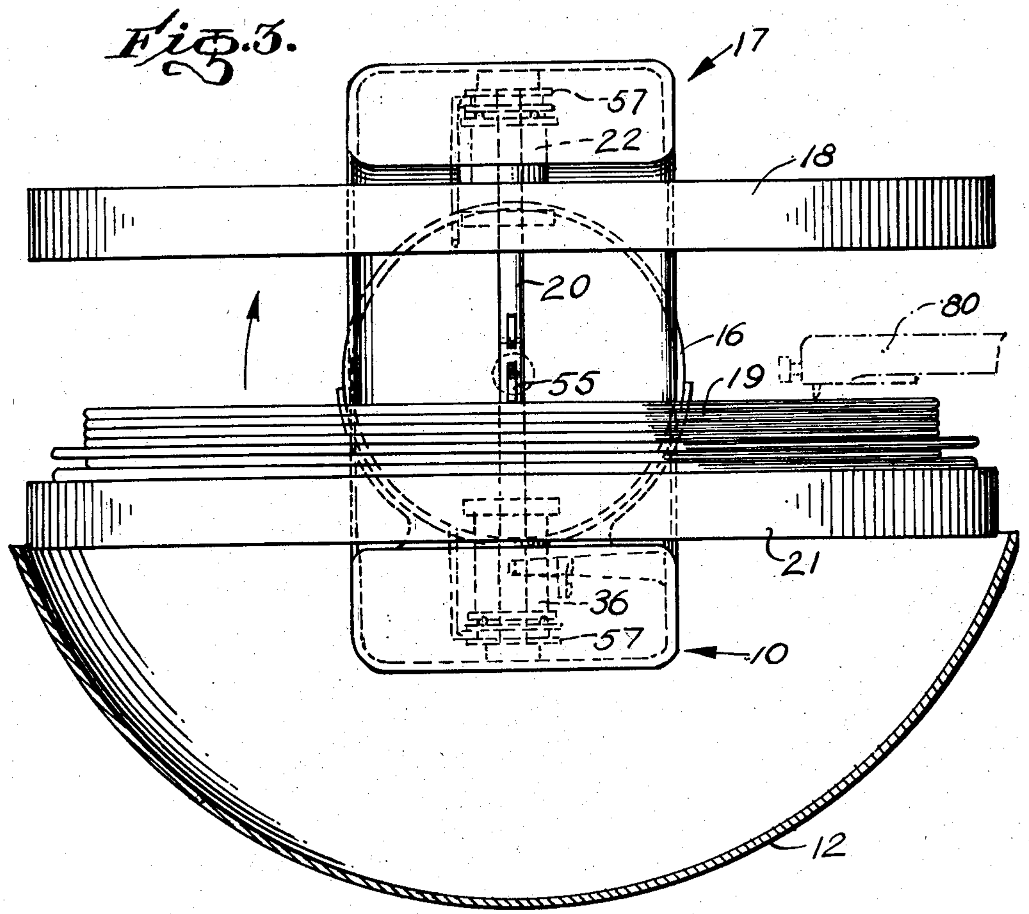
Figure 3 is an end elevational view looking from the right of Figure 1 and shown partly in section.

Referring now more in detail to the drawing, a record player made in accordance with the present invention is shown to include an upper turntable assembly 10 that has a base wall 11 which is pivotally connected to a rigid back wall 14 by means of a hinge unit 13. A longitudinally extending driven shaft 15 extends through a housing 16 and is integrally connected to the central portion of the back wall 14. A cowling 12 depends downwardly from the housing 16 within which the turntable unit is adapted to be rotated. A lower turntable assembly 17 is provided with a record turntable 18 similar to the record turntable 21 associated with the upper assembly 10.

Figures 7, 8:
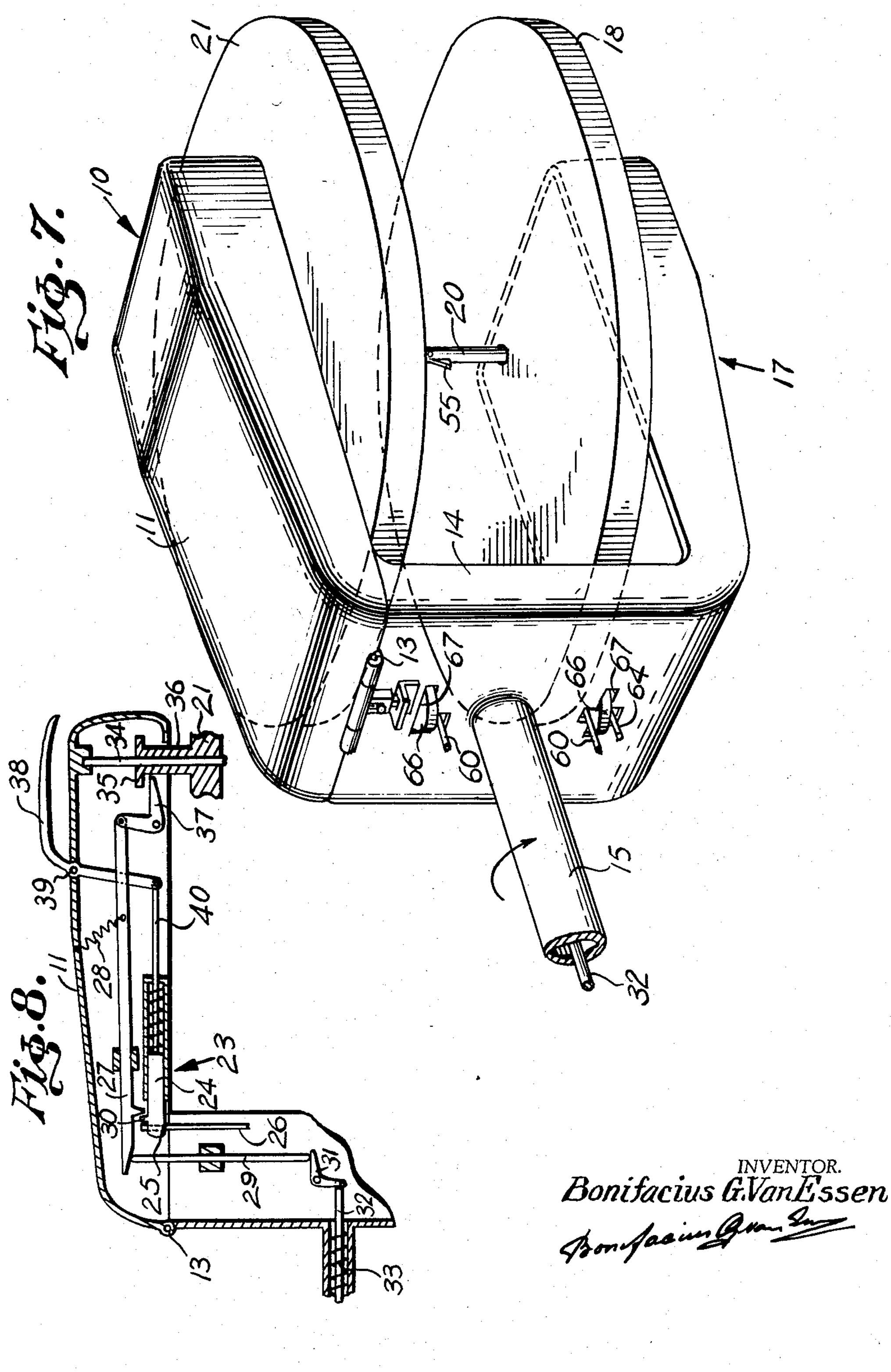
Figure 7 is a perspective view of the record carriage forming a part of the invention.
Figure 8 is a fragmentary vertical sectional view shown partly in elevation of a portion of the mechanism.

In arranging the device for use, the base 11 of the upper turntable assembly is rotated to the adjusted position 10*a*, as shown in Figure 1, in which position a plurality of disc type records 19 of different sizes are lowered upon the record spindle 20 which is integral with the base of the lowered turntable assembly 17. Following this, the base 11 is then rotated to the operative position so that the upper turntable 21 is virtually supported upon the top of the stack of records 19 and maintains them in a horizontal position. A safety lock mechanism 23, as shown in Figure 8, prevents operation of the unit until the upper base 11 has been properly closed. This mechanism includes a plunger 24 which, when in an operative locked position, is received within the opening 25 of a stationary member 26. In this position, an associated lever 27 is permited to depress a rod 29 under the action of a tension spring 28, which rod, in turn, rotates a crank 31 which extends a control plunger 32 in a rearward direction against the action of a compression spring 33 to energize the drive motor. In the event that the base member 11 is not properly seated, the movement of the lever 27 is prevented by the upwardly extending lug 30. Another safety mechanism is associated with this locking mechanism which prevents energization of the motor in the event that all of the records have been removed from association with the upper turntable 21, thereby permitting the spindle 36 thereof to be lowered to an extreme position, in which position an outwardly extending flange 35 thereof is operative to rock a crank 37 about its pivot to withdraw the lever 27 out of depressing engagement with the rod 29 so that the motor cannot be energized until at least one or more records are placed upon the record spindle 20. A manually operated handle 38 hingedly connected to the base member 11 by means of a pivot 39 provides means for unlocking the upper turntable assembly 10 through the plunger 40 which is operative to retract the lock plunger 24 whenever it is desired to gain access to the record spindle 20.

Figure 4:
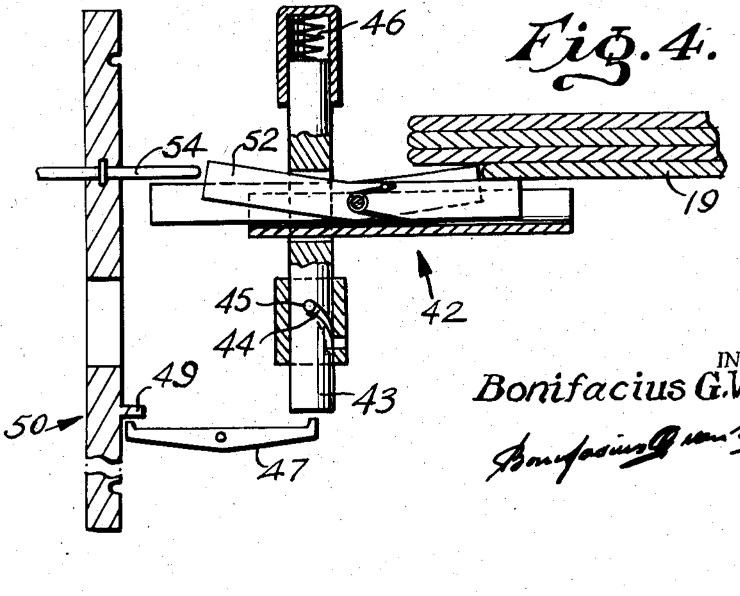
Figure 4 is an enlarged vertical sectional view partly in elevation of one of the parts of the invention.
Figure 5:
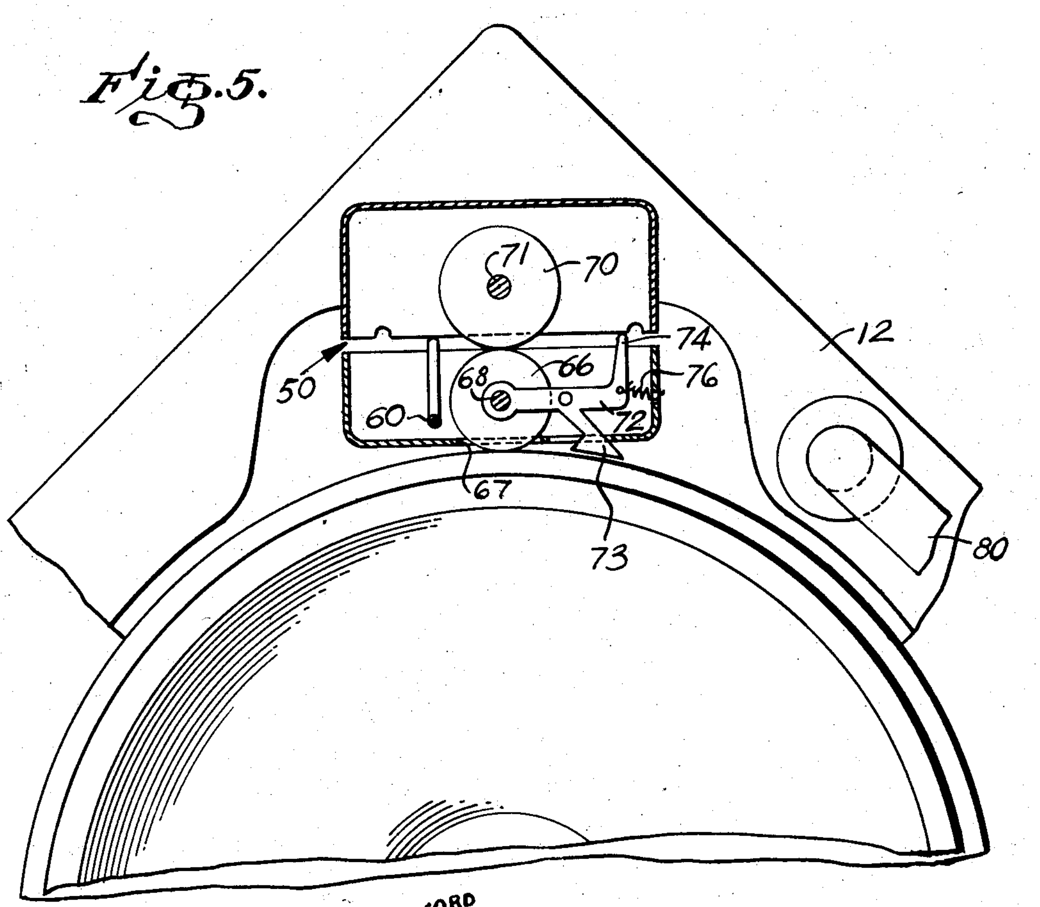
Figure 5 is a horizontal sectional view of another part of the present invention.
Figure 6:
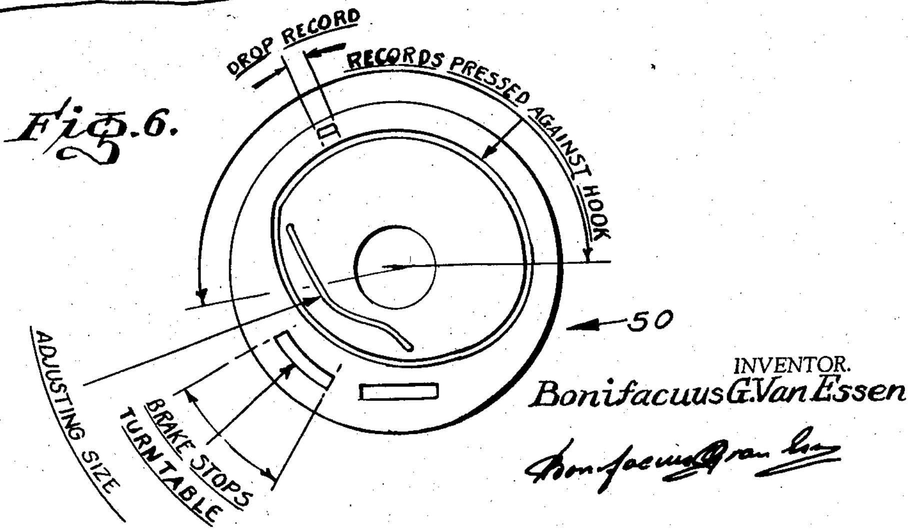
Figure 6 is a diagrammatic view of the timing mechanism.

An adjuster 42 of somewhat conventional construction is shown in Figure 4 to include a pin 43 having a cam slot 44 into which a follower pin 45 extends. Thus, in response to upward movement by a lever 47, the upwardly moving pin 43 is also caused to rotate about its longitudinal axis against the action of the compression spring 46 so as to rotate the selection strips 52 out of the path of the records 19. This movement of the lever 47 is controlled through the action of a cam 49 carried upon the timing cam plate 50 which is in a fixed position upon the housing 16 and which controls all of the movements of the turntable assemblies. When in an operative position, these strips 52 are operative to select the proper stroke for the next record to be played so that a sufficient push can be exerted to dislodge the record 19 from the record release mechanism 55 associated with the record spindle 20. A manual plunger 54 is operative to effect manual operation of the record release mechanism 55 whenever desired.

It will be recognized that whenever the turntables are rotated from one position in which one of the turntables is at the lowest position to another position in which the opposite turntable is in the lowest position, the records carried by the lowest turntable that is being rotated to an upper position are likely to become damaged when striking the record release mechanism 55 unless they are cushioned in some manner. Accordingly, an automatic record displacement unit is provided for preventing this damage. A sleeve 57 that is slidably supported upon the outermost extremities of each of the record spindles 20, 34, associated with the respective turntable assemblies is adapted to be moved toward the center of the record spindle 20 by one end of a lever 58 that is pivotally mounted upon a pivot pin 59 and which has an actuator pin 60 associated with the opposite end thereof for sliding the turntable spindle 22, 36, respectively toward the center of the record spindle 20 during such rotational movement. An actuator pin 60 which is guided for driving movement with the outer end of the lever 58 by the timing cam plate 50 is operative to exert sufficient downward force upon the associated end of the lever 58 to effect the movement of the turntable and all of the records supported thereon so that by the time the turntable reaches the uppermost position, all of the records are bearing against the release mechanism 55 and thus are not subjected to any shock. A dropping arm 62 and an associated lever 63 actuated by a pin 64 in engagement with the timing cam plate 50 assures that a record is dropped by the record release mechanism 55 of the record spindle 20 every second turn of the mechanism.

Each turntable assembly also includes a friction drive roller 66 that is in driving engagement with the associated turntable 18, 21, through an opening 67 in the back wall 14 of the unit, each such roller 66 being mounted upon a shaft 68. A drive roller 70 supported upon a shaft 71 is adapted to alternately drive one of the friction rollers 66 as it is rotated into position at the lowest position, in which position the friction drive roller 70 driven by any electric motor means through the shaft 71 is operative to frictionally engage with the adjacent driven roller 66 to rotate the associated turntable. A brake lever 72 has one end rotatably supported upon the drive shaft 68 of each turntable assembly and includes a brake shoe 73 that is maintained out of engagement with the associated turntable by means of a tension spring 76 acting upon the outermost end of the lever 72. This end of the lever has a follower 74 which is controlled by the timing cam plate 50 in response to rotation of the entire turntable assembly so as to automatically prevent rotation of the associated turntable as it is rotated out of its lowest position. The pickup arm 80 is supported upon the cowling 12 adjacent to the lower one of the turntables and is automatically operative to engage the record carried thereby in a conventional manner.

In the operation of the apparatus, the records are first stacked upon the record spindle 20 and the uppermost turntable assembly 10 moved to the locked position. Upon first energizing the unit, the spindle 15 will rotate the entire assembly about its longitudinal axis one-half of a complete revolution so that the outermost surface of the first record will be brought into playing engagement with the tone arm 80. After that side of the record has been played, the mechanism is rotated another one-half of a revolution, following which the outermost record is permitted to drop by the release mechanism on to the other turntable 18 so that the opposite thereof can now be played by the pickup arm 80. This procedure is repeated for each record, whereby both sides of each record are played sequentially without interruption and completely automatically. Of course, the timing cam plate 50 controls all of the movements of the drive and brake mechanism and also cooperates with the various safety features so as to prevent damage to the machine.

While various changes may be made in the detail construction, it shall be understood that such changes shall be within the spirit and scope of the present invention as defined by the appended claims.

What I claim as new and desire to protect by Letters Patent of the United States is:

1. A record changer for record players for sequentially and automatically playing both sides of disc records of various sizes mixed together comprising, in combination, a shaft, a wall carried by said shaft, motor means for rotating said shaft and wall, a first turntable assembly pivotally supported upon said wall for rotation about an axis perpendicular to the plane of the longitudinal axis of said shaft, a second turntable assembly rigidly supported upon said shaft, a common spindle extending between said turntable assemblies adapted to support a stack of records of diverse sizes, a pickup arm adapted to engage the exposed surface of the uppermost record of the turntable assembly in the lowest position, and means for alternately rotating said first and second turntable assemblies into said lowest position, each turntable assembly including a turntable, a drive roller in driving engagement with said turntable, a brake for preventing rotation of said turntable, a turntable mounting pin, and a spindle secured to the center of said turntable slidably supported for rotation and longitudinal movement upon said mounting pin, and said common spindle including retractable stop means for engaging records carried at each end thereof.

2. The combination according to claim 1, wherein each said turntable assembly comprises displacement means for urging records carried thereby toward said stop means in response to movement out of said lowest position.

3. The combination according to claim 2, wherein said first turntable assembly includes sensing means for disengaging said motor means in response to the removal of all of the records supported upon said associated spindle.

4. The combination according to claim 3, further comprising safety latch means integral with said first turntable assembly for locking said assembly in a spaced parallel relationship with said turntable assembly.

5. The combination according to claim 4, wherein said safety latch means comprises means for deenergizing said motor means when said first assembly is not completely locked.

6. The combination according to claim 5, wherein said safety latch means has an operating control rod in common with said sensing means.

7. The combination according to claim 6, further comprising a cam plate for sequentially controlling all of the movements of both of said turntable assemblies.

8. The combination according to claim 7, wherein said first and second turntables are rotatably mounted within the cowling of a record player, and said pickup arm is supported upon said cowling.

References Cited in the file of this patent

FOREIGN PATENTS

| | | |
|---|---|---|
| 395,137 | Great Britain | July 13, 1933 |
| 647,416 | Great Britain | Dec. 13, 1950 |